United States Patent
Uhari et al.

(10) Patent No.: US 9,635,542 B2
(45) Date of Patent: *Apr. 25, 2017

(54) MOBILE APPARATUS WITH MULTIPLE SUBSCRIBER IDENTITY MODULES

(71) Applicant: UROS TECHNOLOGY S.À R.L., Ettelbruck (LU)

(72) Inventors: Tommi Uhari, Oulu (FI); Ilkka Rahikainen, Oulu (FI); Jari A. Kokkonen, Oulu (FI)

(73) Assignee: UROS TECHNOLOGY S.À R. L., Ettelbruck (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,446

(22) Filed: Feb. 25, 2016

(65) Prior Publication Data
US 2016/0249204 A1    Aug. 25, 2016

(30) Foreign Application Priority Data
Feb. 25, 2015   (GB) .................................. 1503154.5

(51) Int. Cl.
*H04M 1/00* (2006.01)
*H04B 1/38* (2015.01)
(Continued)

(52) U.S. Cl.
CPC ........... *H04W 8/183* (2013.01); *H04M 1/278* (2013.01); *H04W 48/18* (2013.01); *H04W 88/06* (2013.01)

(58) Field of Classification Search
CPC ..... H04W 8/183; H04W 88/04; H04W 88/06; H04W 48/18; H04W 8/24; H04M 1/278; H04M 2250/66
(Continued)

(56) References Cited

U.S. PATENT DOCUMENTS

| | | | |
|---|---|---|---|
| 5,987,325 A | 11/1999 | Tayloe | |
| 9,344,131 B2* | 5/2016 | Kokkonen | .............. H04W 8/18 |

(Continued)

FOREIGN PATENT DOCUMENTS

| | | |
|---|---|---|
| DE | 20 2010 005 832 U1 | 9/2010 |
| EP | 2 618 599 A1 | 7/2013 |

(Continued)

OTHER PUBLICATIONS

Aug. 18, 2014 Office Action issued in European Patent Application No. 12151906.0.

(Continued)

*Primary Examiner* — Ankur Jain
(74) *Attorney, Agent, or Firm* — Oliff PLC

(57) ABSTRACT

A mobile apparatus includes a first slot to receive a first subscriber identity module card including a default subscriber identity module, and a second slot to receive a second subscriber identity module card including a plurality of alternative subscriber identity modules. One or more memories and computer program code are configured to, with one or more processors, cause the mobile apparatus at least to: communicate, with a wireless transceiver utilizing the default subscriber identity module as the master, voice and message services; communicate, with the wireless transceiver, selection data with an operator-independent external electronic service; receive, with the wireless transceiver utilizing the default subscriber identity module, network information; obtain location data; select an alternative subscriber identity module on the basis of the selection data, the network information, and the location data; and communicate, with the wireless transceiver utilizing the selected alternative subscriber identity module, data communication services.

12 Claims, 3 Drawing Sheets

(51) Int. Cl.
*H04W 8/18* (2009.01)
*H04M 1/278* (2006.01)
*H04W 48/18* (2009.01)
*H04W 88/06* (2009.01)

(58) Field of Classification Search
USPC .......................................................... 455/558
See application file for complete search history.

(56) References Cited

U.S. PATENT DOCUMENTS

| | | |
|---|---|---|
| 2005/0075106 A1* | 4/2005 | Jiang ................. H04M 3/42263 455/432.3 |
| 2007/0259691 A1 | 11/2007 | Santos Garcia |
| 2009/0186651 A1 | 7/2009 | You |
| 2010/0240414 A1 | 9/2010 | Lotenberg |
| 2011/0151836 A1 | 6/2011 | Dadu et al. |
| 2011/0269456 A1* | 11/2011 | Krishnaswamy ....... H04W 8/26 455/426.1 |
| 2013/0072257 A1 | 3/2013 | Evans et al. |
| 2013/0130676 A1 | 5/2013 | Manso |
| 2013/0190050 A1 | 7/2013 | Kokkonen et al. |
| 2013/0190051 A1 | 7/2013 | Kokkonen et al. |
| 2013/0210382 A1 | 8/2013 | Korkiakoski et al. |
| 2013/0273972 A1 | 10/2013 | Korkiakoski et al. |
| 2013/0288748 A1* | 10/2013 | Korkiakoski et al. |
| 2015/0304506 A1* | 10/2015 | Zhu ........................ H04M 15/49 455/406 |
| 2015/0365815 A1 | 12/2015 | Sakkinen et al. |
| 2015/0365816 A1 | 12/2015 | Timonen et al. |

FOREIGN PATENT DOCUMENTS

| | | |
|---|---|---|
| EP | 2618598 A1 | 7/2013 |
| EP | 2627033 A1 | 8/2013 |
| EP | 2 651 163 A1 | 10/2013 |
| EP | 2 661 129 A1 | 11/2013 |
| EP | 2955947 A1 | 12/2015 |
| EP | 2955948 A1 | 12/2015 |

OTHER PUBLICATIONS

Jun. 11, 2012 Search Report issued in European Patent Application No. 12151906.0.

Mar. 18, 2015 Office Action issued in British Patent Application No. 1503154.5.

Aug. 14, 2015 Office Action issued in British Patent Application No. 1503154.5.

Oct. 22, 2015 Office Action issued in British Patent Application No. 1503154.5.

* cited by examiner

MOBILE APPARATUS WITH MULTIPLE SUBSCRIBER IDENTITY MODULES

FIELD

The invention relates to a mobile apparatus, and to a computer program of a mobile apparatus.

BACKGROUND

Seven previous European patent applications by the Applicant, 12151906.0, 12151908.6, 12154706.1, 12163858.9, 12166131.8, 14172104.3, and 14172129.0 disclose various apparatuses utilizing a plurality of subscriber identity modules (SIM) for one user of a mobile apparatus. As the subscriber identity modules are not designed for such sophisticated use, their use requires even further ideas.

BRIEF DESCRIPTION

The present invention seeks to provide an improved mobile apparatus, method and computer program.

According to an aspect of the present invention, there is provided a mobile apparatus comprising: a wireless transceiver; a first slot to receive a first subscriber identity module card including a default subscriber identity module; a second slot to receive a second subscriber identity module card including a plurality of alternative subscriber identity modules; one or more processors; and one or more memories including computer program code; wherein the one or more memories and the computer program code configured to, with the one or more processors, cause the mobile apparatus at least to: communicate, with the wireless transceiver utilizing the default subscriber identity module as the master, voice and message services; communicate selection data with an operator-independent external electronic service, wherein the selection data comprises information about network operators and data communication services offered by the plurality of the alternative subscriber identity modules, in particular the selection data comprises one or more of: a data transfer capacity of the data communication service, costs of using the data communication service, costs of using the data communication service according to the day of week and/or time of day, and/or according to the data transfer speed, availability of the operator/data communication service in a specific location, rules for the selection indicating the preference between different operators in different locations; receive, with the wireless transceiver utilizing the default subscriber identity module, network information about available network operators; obtain location data determining a current location of the mobile apparatus; select an alternative subscriber identity module on the basis of the selection data, the network information, and the location data; and communicate, with the wireless transceiver utilizing the selected alternative subscriber identity module, data communication services.

According to another aspect of the present invention, there is provided a method for operating a mobile apparatus, the mobile apparatus comprising: a wireless transceiver; a first slot to receive a first subscriber identity module card including a default subscriber identity module; and a second slot to receive a second subscriber identity module card including a plurality of alternative subscriber identity modules; the method comprising: communicating, with the wireless transceiver utilizing the default subscriber identity module as the master, voice and message services; communicating selection data with an operator-independent external electronic service, wherein the selection data comprises information about network operators and data communication services offered by the plurality of the alternative subscriber identity modules, in particular the selection data comprises one or more of: a data transfer capacity of the data communication service, costs of using the data communication service, costs of using the data communication service according to the day of week and/or time of day, and/or according to the data transfer speed, availability of the operator/data communication service in a specific location, rules for the selection indicating the preference between different operators in different locations; receiving, with the wireless transceiver utilizing the default subscriber identity module, network information about available network operators; obtaining location data determining a current location of the mobile apparatus; selecting an alternative subscriber identity module on the basis of the selection data, the network information, and the location data; and communicating, with the wireless transceiver utilizing the selected alternative subscriber identity module, data communication services.

According to another aspect of the present invention, there is provided a computer program code which, when executed, causes a mobile apparatus to perform the method explained above.

The invention may provide at least the advantage that the mobile apparatus is capable of independently (without any extra device accommodating subscriber identity modules) providing flexible use with a plurality of subscriber identity modules.

LIST OF DRAWINGS

Example embodiments of the present invention are described below, by way of example only, with reference to the accompanying drawings, in which FIG. 1 illustrates example embodiments of a general operating environment of a mobile apparatus;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the mobile apparatuses have been depicted as separate single entities, different parts may be implemented in one or more physical or logical entities.

Figure 1:
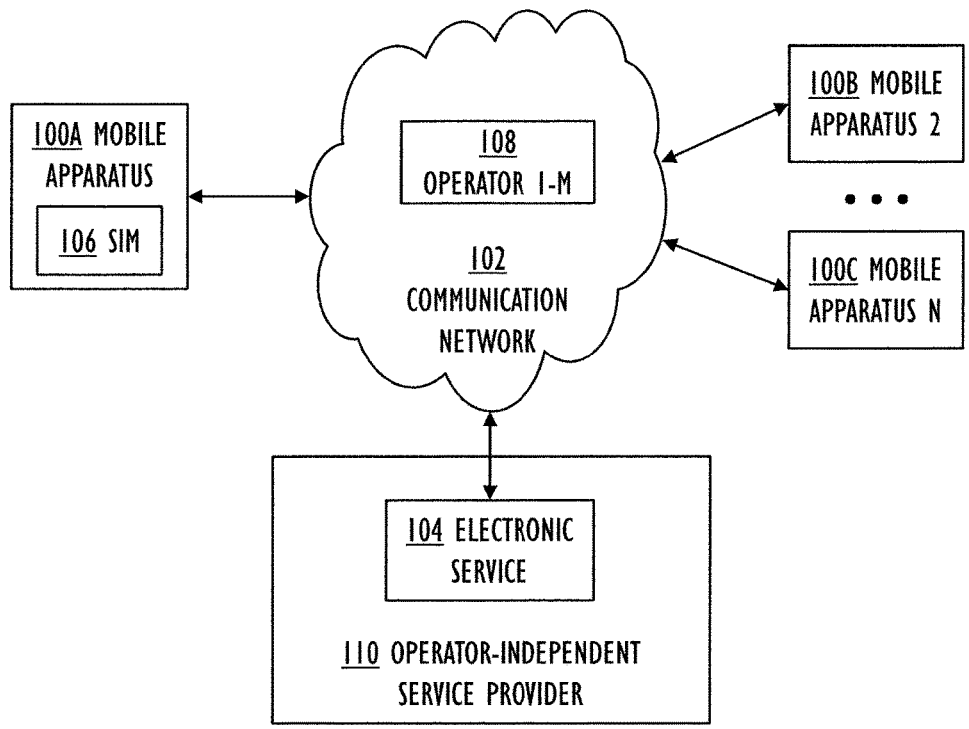

FIG. 1 illustrates example embodiments of a general operating environment of a mobile apparatus 100.

The number of the mobile apparatuses 100A, 100B, 100C may vary from 1 to N, wherein N is any integer greater than one.

The mobile apparatus 100A, 100B, 100C may communicate through a wireless communication network 102 by utilizing a subscriber identity module (SIM) 106 provided by an operator 108. The number of the operators 108 may vary from 1 to M, wherein M is any integer greater than one.

The wireless communication network 102 is operated by the operator(s) 108. The operator (also known as a mobile phone operator, mobile network operator, wireless service provider, wireless carrier, cellular company, or mobile network carrier) 108 is a telephone company providing services for the subscriber. Some examples of the mobile phone operators 108 include: China Mobile, Vodafone, Orange, TeliaSonera, T-Mobile, Verizon Wireless etc.

The mobile phone operator 108 may either own the underlying network and spectrum assets required to run the service, or the mobile phone operator 108 may be a virtual one, buying wholesale service from another mobile phone operator 108 owning the underlying network and spectrum assets and selling on to its own customers.

In the described embodiments, the mobile phone operators 108 may first supply a service provider 110 with at least some of the subscriber identity modules 310, 316, 318, whereupon the service provider 110 assembles a suitable set of the subscriber identity modules 310, 316, 318 and gives them to the end-user for use. Other ways of supplying the subscriber identity modules 310, 316, 318 to the end-user are also feasible: the service provider 110 may give one or more subscriber identity module cards 308, 314 to the end-user who will set them to the mobile apparatus 100, for example.

Even though connections between the subscriber identity module 106 and the operator infrastructure 108 are not shown in FIG. 1, it is clear that such connections exist, as the subscriber identity modules 106 remain, in general, under management of the operators 108; the service provider 110 only supports their flexible use under varying circumstances.

In an example embodiment, the service provider 110 may be an operator-independent supplier/vendor obtaining the subscriber identity modules 106 from various network operators 108 and providing them to end-users (=subscribers).

In an example embodiment, the plurality of the alternative subscriber identity modules 316, 318 stem from a plurality of different operators 108.

In an example embodiment, the plurality of the alternative subscriber identity modules 316, 318 have been compiled in the second subscriber identity module card 314 by the operator-independent service provider 110 providing the operator-independent external electronic service 104.

The mobile apparatuses 100A, 100B, 100C may also communicate with an electronic service 104 accessible through the communication network 102, the electronic service 104 being provided by the service provider 110.

In an example embodiment, the electronic service 104 may be implemented by a suitable computing resource or a combination of various computing resources.

In an example embodiment, the computing resource 104 may be implemented as a single server computer or as a cluster of computers. The server is a part of the client-server computing model that acts as distributed application which partitions tasks or workloads between the provider of a resource or service, called server, and the service requester, called client. The server 104 may serve a number of mobile apparatuses 100A, 100B, 100C. The server computer 104 may be a host that is running one or more server programs which share their resources with clients 100. The client 100 may request a service function (a search) or content (search results) from the server 104. Also, the client 100 may initiate a communication session with the server 104 which awaits incoming requests.

In an example embodiment, the electronic service 104 may also operate according to the cloud computing model, at least in part. Naturally, besides these example embodiments of the electronic service 104, other feasible computing architectures may be utilized as well to implement the hardware and software of the electronic service 104. Consequently, besides operating according to the client/server architecture, push technology may be utilized as well. In push technology, the request for a transaction is initiated by the electronic service 104, whereas with the pull technology the request for the information is initiated by the client 100.

In an example embodiment, the mobile apparatus 100 is a portable electronic communication apparatus. A non-exhaustive list of the types of the mobile apparatus 100 includes: a mobile phone, a smartphone, a tablet computer, a phablet, a smartwatch, a general-purpose mobile computing device. In an example embodiment, the mobile apparatus 100 is a general-purpose off-the-shelf computing device, as opposed to a purpose-build proprietary equipment, whereby research & development costs will be lower as only the special-purpose software (and not the hardware) needs to be designed, implemented and tested. The mobile apparatus 100 may employ a suitable operating system such as iOS, Android, or Windows Phone, for example.

In an example embodiment, the communication network 102 comprises at least one wireless standard/non-standard/proprietary communication network, which is coupled with a wired network such as the Internet.

The wireless communication system 100 may be any standard/non-standard/proprietary radio system that supports the use of the subscriber identity modules 310, 316, 318. In an example embodiment, the wireless communication network 110 comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, and other radio systems (in their present forms and/or in their evolution forms).

In an example embodiment, the wireless communication network 102 further comprises a wireless local area network (WLAN), a hotspot, or an access point, all of which may provide Internet access through the use of a router connected to a link to an Internet service provider.

Figure 2:
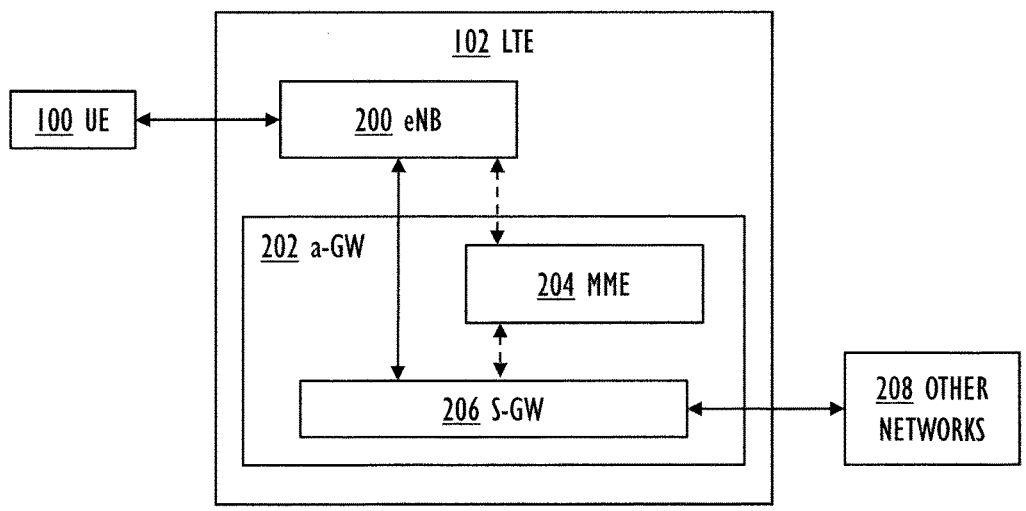
FIG. 2 illustrates an example embodiment of a mobile phone network.

FIG. 2 illustrates an example of the mobile telephone network 102, LTE. The three basic elements of the system 102 are UE (=mobile station) 100, eNB (=base station) 200 in a radio network and an access gateway (a-GW) 202 in a core network. The base station 200 may be called, depending on the system, a Node B, enhanced or evolved NodeB (eNB), a home eNode B (HeNB), an access point (AP), an IEEE 802.11 based access point, a femto node, a femto base station, or any other equipment belonging to the network infrastructure of the wireless communication network 102, and implementing the radio communication interface with the mobile apparatus 100. Functionalities of the eNB 200 may include: all radio protocols, mobility management, all retransmissions, header compression, and packet data convergence protocols. The a-GW 202 provides the interface of the cellular radio system 102 to/from the other networks 208 such as the Internet. The a-GW 202 may be streamlined by separating the user and the control planes: a mobility management entity (MME) 204 is just a control plane entity and the user plane bypasses MME 204 directly to a serving gateway (S-GW) 206.

Figure 3:
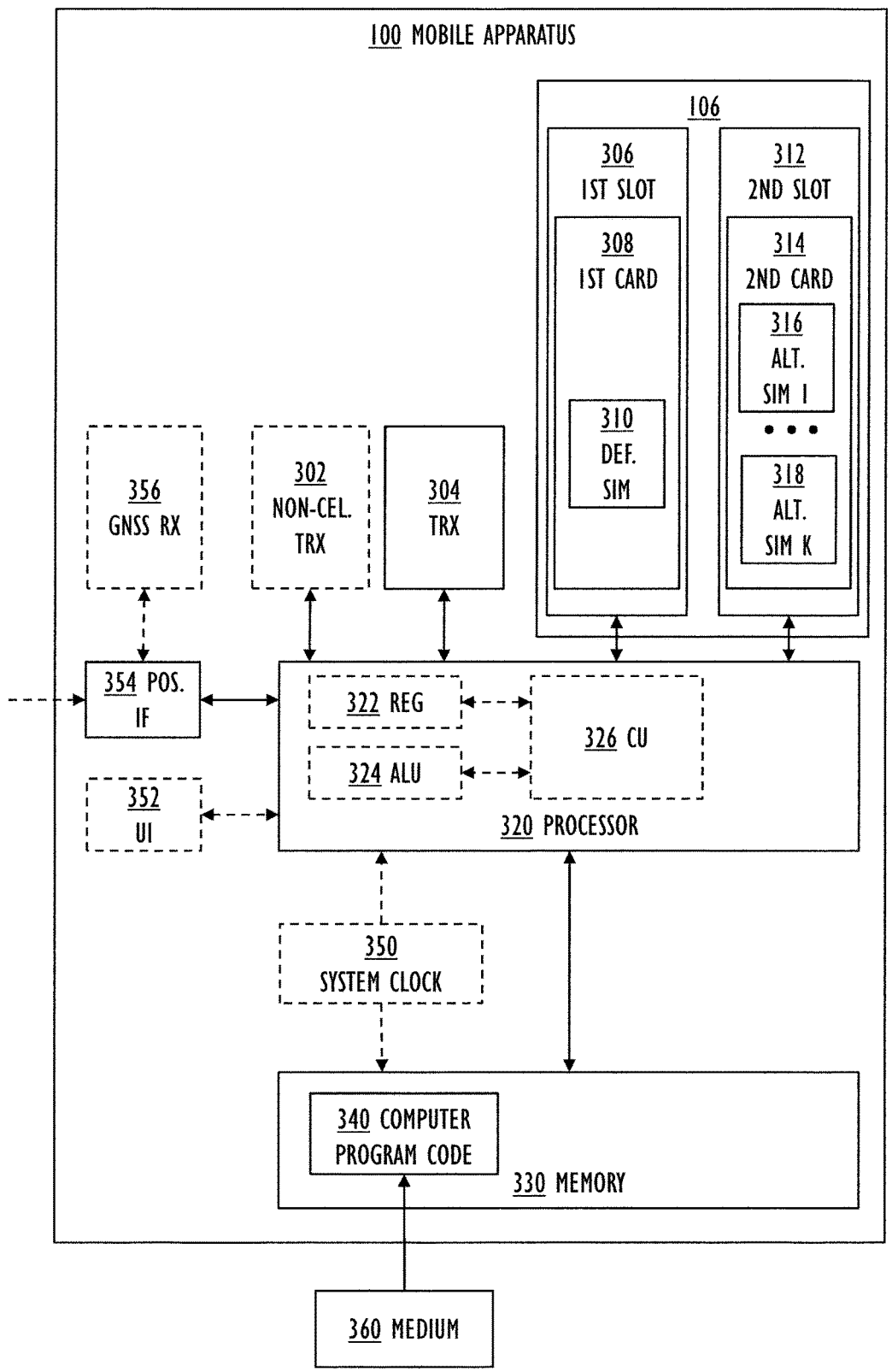
FIG. 3 illustrates example embodiments of the mobile apparatus.

FIG. 3 illustrates example embodiments of the mobile apparatus 100.

The mobile apparatus 100 comprises a wireless transceiver 304. In an example embodiment, the wireless transceiver 303 is operable with the mobile phone network 102 employing the subscriber identity modules 310, 316, 318 storing subscriber data, which is network-specific information used to authenticate and identify the subscriber in the mobile phone network 102.

In an example embodiment, the mobile apparatus 100 comprises a non-cellular radio transceiver 302 (as opposed to the cellular radio transceiver 304). In an example embodiment, the non-cellular radio transceiver 302 may utilize a short-range radio transceiver such as a Bluetooth, Bluetooth low energy (BLE), Wi-Fi (or WiFi) or other WLAN transceiver (based on IEEE (Institute of Electrical and Electronics Engineers) 802.11 standard or its evolution versions (IEEE 802.11ac etc.) for example).

The mobile apparatus 100 also comprises a first slot 306 to receive a first subscriber identity module card 308 including a default subscriber identity module 310, and a second slot 312 to receive a second subscriber identity module card 314 including a plurality of alternative subscriber identity modules 316, 318. The number of the alternative subscriber identity modules may vary from 1 to K, wherein K is any integer greater than one.

In an example embodiment, the mobile apparatus 100 is a dual-SIM phone.

In an example embodiment, the mobile apparatus 100 is a triple-SIM phone, which further comprises a third slot to receive a third subscriber identity module card, whereby the plurality of the alternative subscriber identity modules 316, 318 is distributed between the second subscriber identity card and the third subscriber identity card. In an example embodiment, the mobile apparatus 100 comprises further slots to receive further subscriber identity module cards, whereby the plurality of the alternative subscriber identity modules 316, 318 is distributed between the additional subscriber identity cards as well.

In an example embodiment, the slot 306, 312 comprises a SIM card reader, which is capable of reading (and writing) information from the (contact) card 308, 314.

In an example embodiment, the subscriber identity module 310, 316, 318 is an integrated circuit storing subscriber data. The subscriber identity module 310, 316, 318 may be embedded into a removable SIM card 308, 314. First SIM cards were of credit card size, 85.60 mm×53.98 mm×0.76 mm, but a newer mini-SIM card is considerably smaller, 25 mm×15 mm×0.76 mm, or a micro-SIM card is even smaller, 15 mm×12 mm×0.76 mm. However, these measures are only example embodiments.

It is also to be noted than one physical SIM card may include a number of different subscriptions: one SIM card may be a multi-IMSI SIM card having many different subscriber identities in the same card. In an example embodiment, the second subscriber identity module card 314 comprises a multiple-subscriber identity module card including the plurality of the alternative subscriber identity modules 316, 318.

Even a software-controlled virtual subscriber identity module is feasible: it is a mobile phone number provided by a mobile network operator 102, 104 that does not require a SIM card to connect phone calls to the user's mobile terminal. In such a scenario, a memory of the mobile apparatus 110, 120 may be used to store subscriber data of the virtual subscriber identity module 114, 116, 124, 126 as required. In an example embodiment, the second subscriber identity module card 314 comprises a software-controlled virtual subscriber identity module card including the plurality of the alternative subscriber identity modules 316, 318. In this example embodiment, at least the second slot 312 is a virtual slot (the first slot 306 being a mechanical slot or a virtual slot), a software function, for example, to enable the access of the software-controlled virtual subscriber identity module card 314.

In an example embodiment, the subscriber identity modules 310, 316, 318 comprise prepaid subscriber identity modules obtained from various mobile phone operators 108.

The subscriber identity modules 310, 316, 318 may include data enabling utilization of the wireless communication network 102 such as data relating to subscriber identification and authentication. Data relating to the subscriber identity modules 310, 316, 318 may include, for example, preferred roaming lists, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialing numbers (SDN), advice-of-charge parameters, and value added service (VAS) applications. Further information may be found in the GSM Technical Specification 11.11.

Besides being called subscriber identity module, also other names and abbreviations may be used to refer to subscriptions. USIM (Universal Subscriber Identity Module) is an application for UMTS running on a UICC (Universal Integrated Circuit Card). The USIM is a logical entity on the physical card storing user subscriber information, authentication information, text messages, and phone book contacts. For authentication purposes, the USIM stores a long-term pre-shared secret key, which is shared with the Authentication Centre (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The mobile apparatus 100 also comprises one or more processors 320, and one or more memories 330 including computer program code 340. The one or more memories 330 and the computer program code 340 are configured to, with the one or more processors 320, cause the mobile apparatus 100 to perform various operations described later with reference to FIG. 4.

The term 'processor' 320 refers to a device that is capable of processing data. Depending on the processing power needed, the mobile apparatus 100 may comprise several processors 320 such as parallel processors or a multicore processor. When designing the implementation of the processor 320, a person skilled in the art will consider the requirements set for the size and power consumption of the mobile apparatus 100, the necessary processing capacity, production costs, and production volumes, for example.

The term 'memory' 330 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The processor 320 and the memory 330 may be implemented by an electronic circuitry. A non-exhaustive list of implementation techniques for the processor 320 and the memory 330 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

In an example embodiment, a system clock 350 constantly generates a stream of electrical pulses, which cause the various transferring operations within the mobile apparatus 100 to take place in an orderly manner and with specific timing.

In an example embodiment, the processor 320 may be implemented as a microprocessor implementing functions of a central processing unit (CPU) on an integrated circuit. The CPU is a logic machine executing a computer program code 340. The computer program code 340 may be coded as a computer program using a programming language, which may be a high-level programming language, such as C, C++, or Java, or a low-level programming language, such as a machine language, or an assembler, for example. The CPU may comprise a set of registers 322, an arithmetic logic unit (ALU) 324, and a control unit (CU) 326. The control unit 326 is controlled by a sequence of the computer program code 340 transferred to the CPU from the (working) memory 330. The control unit 326 may contain a number of microinstructions for basic operations. The implementation of the microinstructions may vary, depending on the CPU design. The microprocessor 320 may also have an operating system (a dedicated operating system of an embedded system, a real-time operating system, or even a general-purpose operating system), which may provide the computer program code 340 with system services.

The computer program code 340 may be implemented by software and/or hardware. In an example embodiment, the software may be written by a suitable programming language, and the resulting executable code 340 may be stored on the memory 330 and run by the processor 320.

An example embodiment provides a computer-readable medium 360 comprising a computer program comprising the computer program code 340 which, when loaded into the mobile apparatus 100 causes the mobile apparatus 100 to perform: communicate, with the wireless transceiver utilizing the default subscriber identity module as the master, voice and message services; communicate, with the wireless transceiver, selection data with an operator-independent external electronic service about network operators and data communication services offered by the plurality of the alternative subscriber identity modules; receive, with the wireless transceiver utilizing the default subscriber identity module, network information about available network operators; obtain location data determining a current location of the mobile apparatus; select an alternative subscriber identity module on the basis of the selection data, the network information, and the location data; and communicate, with the wireless transceiver utilizing the selected alternative subscriber identity module, data communication services.

The example embodiments of the mobile apparatus 100 may be used to enhance the operation of the computer program code 340. There are many ways to structure the computer program code 340. In an example embodiment, the operations of the computer program code 340 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 340 for performing a wide variety of standard operations. In an example embodiment, the computer program code 340 may be in source code form, object code form, executable file, or in some intermediate form. The computer-readable medium 360 may comprise at least the following: any entity or device capable of carrying computer program code 340 to the mobile apparatus 100, a record medium, a computer memory, a read-only memory, an electrical carrier signal, a telecommunications signal, and a software distribution medium. In some jurisdictions, depending on the legislation and the patent practice, the computer-readable medium 360 may not be the telecommunications signal. In an example embodiment, the computer-readable medium 360 may be a non-transitory computer-readable storage medium.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 320, memory 330 and the code 340 of the mobile apparatus 100 may be fabricated with photo masks describing the circuitry.

In an example embodiment, the processor 320 and the memory 330 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 100.

In an example embodiment, a user interface 352 implements exchange of graphical, textual and auditory information with a user. The user interface 352 may be realized with various techniques, such as the display, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 352 may comprise other user interface components, for example various means for focusing a cursor (mouse, track ball, arrow keys, touch sensitive area etc.) or elements enabling audio control. In an example embodiment, the display is implemented by an appropriate technology, such as a liquid crystal display (LCD), a thin-film transistor (TFT) display, a light-emitting diode (LED) display, an organic LED (OLED) display, an electroluminescent display (ELD), or an electronic paper (or e-paper or electronic ink) display, for example. The display may also incorporate other user interaction means, such as touch input, or haptic feedback, i.e. the display may be a multi-touch display.

Naturally, the mobile apparatus 100 may include various other parts, such as a battery, a camera, or a radio-frequency identifier reader, but as they are not needed to further illustrate the example embodiments, they will not be further described.

Figure 4:
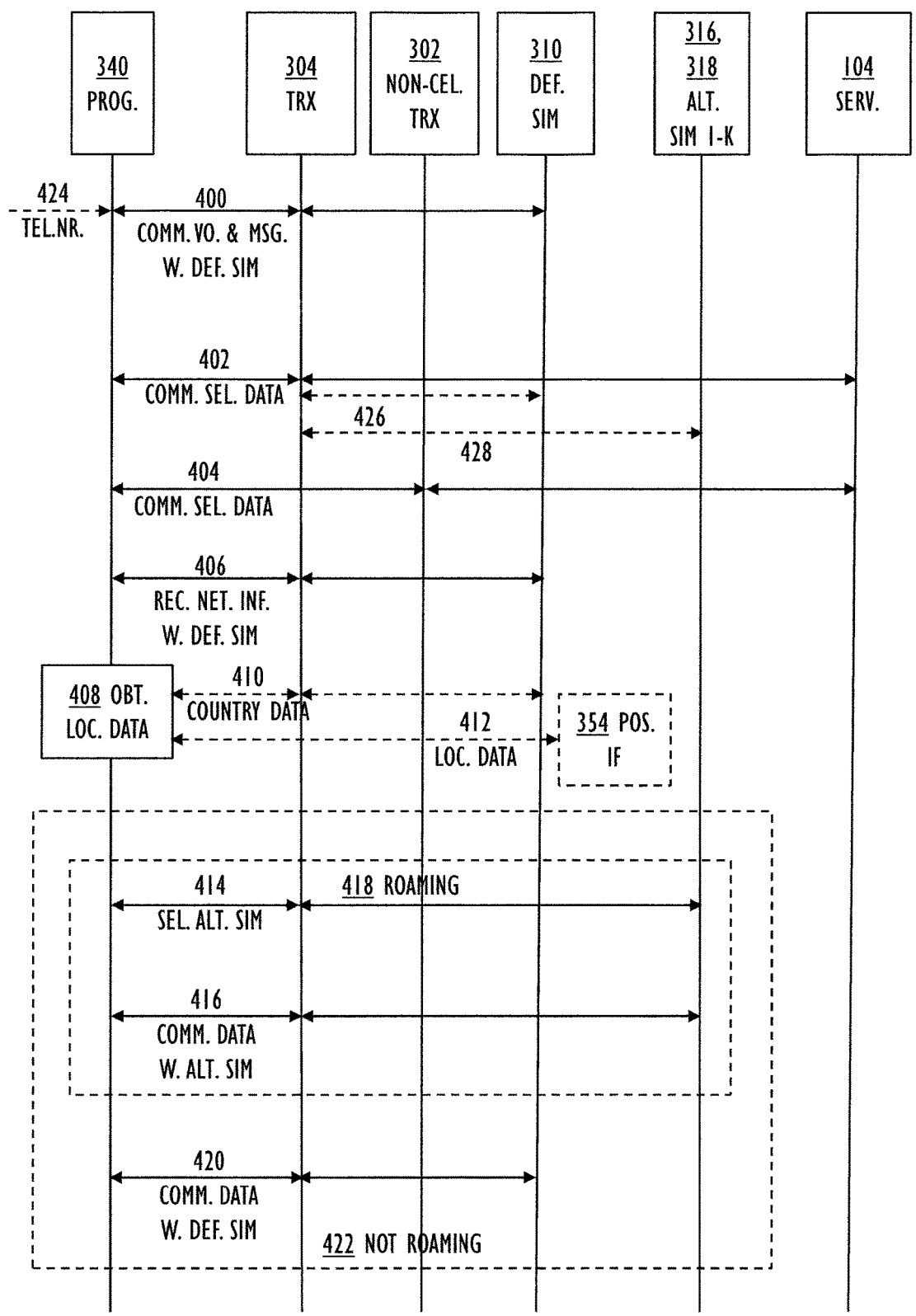
FIG. 4 is a signal sequence chart illustrating example embodiments relating to the use of the mobile apparatus.

Now that the basic structures of the mobile apparatus 100 have been described, we may proceed in describing the operation of the mobile apparatus 100 in more detail with reference to FIG. 4, which is a signal sequence chart illustrating example embodiments relating to the use of the mobile apparatus 100.

The basic sequence comprises six operations.

1) The one or more memories 330 and the computer program code 340 are configured to, with the one or more processors 320, cause the mobile apparatus 100 to communicate 400, with the wireless transceiver 304 utilizing the default subscriber identity module 310 as the master, voice and message services.

The voice service refers to a telephone call carrying ordinary voice transmission. The message service refers to an electronic text message (such as a Short Message Service SMS) and an electronic multimedia message including image, video and sound (such as a Multimedia Messaging Service MMS). The electronic messages are individual messages addressed between users of mobile apparatuses 100.

These are in contrast to data communication services, which refer to the so-called mobile broadband enabling wireless Internet access in order to transfer data to and from the mobile apparatus 100. The transferred data may include e-mail, web surfing, download of streaming mobile content (music, movies, television, social media etc.).

In an example embodiment, the one or more memories 330 and the computer program code 340 are configured to, with the one or more processors 320, cause the mobile apparatus 100 further to control the mobile apparatus 100 such that the voice and message services are always terminated at the mobile apparatus 100 addressed with a same telephone number of the default subscriber identity module 310. With this example embodiment it is ensured that the mobile apparatus 100 may always be contacted with the same telephone number, irrespective of a selected alternative subscriber identity module 316/318.

2) The one or more memories 330 and the computer program code 340 are configured to, with the one or more processors 320, cause the mobile apparatus 100 to communicate 402/404, with the wireless transceiver 304, selection data with an operator-independent external electronic service 104 about network operators and data communication services offered by the plurality of the alternative subscriber identity modules 316, 318. In an example embodiment, the communication 402 with the electronic service 104 is performed with the wireless transceiver 304. Alternatively, or additionally, in an example embodiment, the communication 404 with the electronic service 104 is performed with the non-cellular radio transceiver 302.

In an example embodiment, the selection data comprises information about the network operators and the data communication services, and in particular comprises one or more of the following information: a data transfer capacity of the data communication service, costs of using the data communication service (possibly according to the day of week and/or time of day, and/or according to the data transfer speed), availability of the operator/data communication service in a specific location (country and/or city). The selection data may also include rules for the selection. These rules may indicate the preference between different operators 108 in different locations. For example, the rule may be formulated as follows: use operator X, if location is country A, or if operator X is not available in country A, use operator Y, or if location is country B, use operator Z.

As was explained earlier, the electronic service 104 may be maintained by the operator-independent service provider 110. As the service provider 110 may gather and provide the alternative subscriber identity modules 316, 318, the service provider 110 may also control the use of the data communication services. This control may include billing of the data communication services provided by the alternative subscriber identity module 316, 318. As the service provider 110 may bill the end-user (and pay for the operator 102, 108), the service provider 110 has an interest in that the optimal alternative subscriber identity module 316, 318 is always used. In a way, the service provider 110 may act as a broker, compiling the alternative subscriber identity modules 316, 318 from various operators 102, 108 in order to be able to provide the data communication services for the end-user with fair pricing.

In an example embodiment, the one or more memories 330 and the computer program code 340 are configured to, with the one or more processors 320, cause the mobile apparatus 100 further to communicate 402 the selection data with the operator-independent external electronic service 104 such that the communication 402 is initially performed 424 with the wireless transceiver 304 utilizing the default subscriber identity module 310, whereupon the communication 402 is performed 424/426 with wireless the transceiver 304 utilizing the default subscriber identity module 310 or with the wireless transceiver 304 utilizing one of the alternative subscriber identity modules 316/318.

3) The one or more memories 330 and the computer program code 340 are configured to, with the one or more processors 320, cause the mobile apparatus 100 to receive 406, with the wireless transceiver 304 utilizing the default subscriber identity module 310, network information about available network operators 108.

In an example embodiment, the network information about the available network operators is obtained as a result of the neighbour cell measurements, which the mobile apparatus 100 performs in order to prepare for a handover.

4) The one or more memories 330 and the computer program code 340 are configured to, with the one or more processors 320, cause the mobile apparatus 100 to obtain 408 location data determining a current location of the mobile apparatus 100.

In an example embodiment, the one or more memories 330 and the computer program code 340 are configured to, with the one or more processors 320, cause the mobile apparatus 100 further to obtain the location data by receiving 410, with the wireless transceiver 304 utilizing the default subscriber identity module 310, country data.

In an example embodiment, the mobile apparatus 100 further comprises a positioning interface 354, and the one or more memories 330 and the computer program code 340 are configured to, with the one or more processors 320, cause the mobile apparatus 100 further to obtain 412 the location data with the positioning interface 354.

As illustrated in FIG. 2, the positioning interface 354 may obtain the location data 408 from various sources.

In an example embodiment, the mobile apparatus 100 comprises a global navigation satellite system (GNSS) receiver 356, which generates the location data 408 on the basis of signals received from Earth-orbiting satellites.

GNSS may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 356 determines its location (longitude, latitude, and altitude) using signals transmitted from satellites orbiting the earth. Besides global navigation satellites, the positioning receiver 356 may also determine its location by utilizing other known positioning techniques. It is well known that by receiving radio signals from several different base stations, a mobile phone may determine its location, for example. Other location techniques may be utilized as well such as those developed for use in indoor positioning systems, for example.

5) The one or more memories 330 and the computer program code 340 are configured to, with the one or more processors 320, cause the mobile apparatus 100 to select 414 an alternative subscriber identity module 316/318 on the basis of the selection data 402/404, the network information 406, and the location data 408. The selection may optimize the costs: the mobile apparatus 100 selects, based on the location of the mobile apparatus 100, the cheapest alternative subscriber identity module, which provides the required data communication services as deemed currently available. The price is obtained as a part of the selection data 402/404 and the current availability is detected from the (measured) network information 406, i.e., these are no theoretical values, but real-life up-to-date information. As was explained earlier, the time of day, or the day of the week may also affect the choice: the preferences between the subscriber identity modules may alter. The selection 414 may be automatic or semi-automatic (meaning that a user confirmation via the user interface 352 is required in order the selection to become in force).

6) The one or more memories 330 and the computer program code 340 are configured to, with the one or more processors 320, cause the mobile apparatus 100 to communicate 420, with the wireless transceiver 304 utilizing the selected alternative subscriber identity module 316/318, data communication services.

In an example embodiment, the one or more memories 330 and the computer program code 340 are configured to, with the one or more processors 320, cause the mobile apparatus 100 further to communicate so that the default subscriber identity module 310 is exclusively used only for the voice and message services, and so that the selected alternative subscriber identity module 316/318 is exclusively used only for the data communication services.

In an example embodiment, the one or more memories 330 and the computer program code 340 are configured to, with the one or more processors 320, cause the mobile apparatus 100 further to communicate 420, with the wireless transceiver 304 utilizing the selected alternative subscriber identity module 316/318, data communication services, only while the mobile apparatus is roaming 418 from the point of view of the default subscriber identity module 310. With this example embodiment, the selected alternative subscriber identity module 316/318 provides data communication services while roaming, but at the same time the voice and message services remain in use through the default subscriber identity module 310.

In an example embodiment, the one or more memories 330 and the computer program code 340 are configured to, with the one or more processors 320, cause the mobile apparatus 100 further, if the mobile apparatus 100 is not roaming 422 from the point of view of the default subscriber identity module 310, to select either the default subscriber identity module 310 or one of the alternative subscriber identity modules, 316, 318, for use for the data communication services, and communicate 416/420, with the wireless transceiver 304 utilizing the selected subscriber identity module 310 or 316/318, data communication services, while the mobile apparatus 100 is not roaming 422 from the point of view of the default subscriber identity module 310. The choice whether to use the default subscriber identity module 310 or the alternative subscriber identity module 316/318 for the data communication services while not roaming may be based on costs: choose subscriber identity module that is cheapest to use.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile apparatus comprising:
a wireless transceiver;
a first mechanical slot to receive a first physical subscriber identity module card including a default subscriber identity module;
a second mechanical slot to receive a second physical subscriber identity module card including a plurality of alternative subscriber identity modules;
one or more processors; and
one or more memories storing computer program code, the one or more memories and the computer program code programmed to, with the one or more processors, cause the mobile apparatus to:
communicate, with the wireless transceiver utilizing the default subscriber identity module as a master, voice and message services; communicate selection data with an operator-independent external electronic service, the selection data including information about network operators and data communication services offered by the plurality of the alternative subscriber identity modules, wherein the selection data includes one or more of: a data transfer capacity of the data communication service, costs of using the data communication service, costs of using the data communication service according to a day of week and/or time of day, according to a data transfer speed, availability of an operator/data communication service in a specific location, and/or rules for a selection indicating a preference between different operators in different locations; receive, with the wireless transceiver utilizing the default subscriber identity module, network information about available network operators; obtain location data determining a current location of the mobile apparatus; select an alternative subscriber identity module on a basis of the selection data, the network information, and the location data; and communicate, with the wireless transceiver utilizing the selected alternative subscriber identity module, data communication services, wherein the plurality of the alternative subscriber identity modules have been compiled in the second physical subscriber identity module card by an operator-independent service provider providing the operator-independent external electronic service.

2. The apparatus of claim 1, wherein the second physical subscriber identity module card comprises a software-controlled virtual subscriber identity module card.

3. The apparatus of claim 1, wherein the second physical subscriber identity module card comprises a multiple-subscriber identity module card.

4. The apparatus of claim 1, wherein the plurality of the alternative subscriber identity modules stem from a plurality of different operators.

5. The apparatus of claim 1, wherein the one or more memories and the computer program code are configured to, with the one or more processors, cause the mobile apparatus further to:

control the mobile apparatus such that the voice and message services are always terminated at the mobile apparatus addressed with a same telephone number of the default subscriber identity module.

6. The apparatus of claim 1, wherein the one or more memories and the computer program code are configured to, with the one or more processors, cause the mobile apparatus further to:

obtain the location data by receiving, with the wireless transceiver utilizing the default subscriber identity module, country data.

7. The apparatus of claim 1, wherein the mobile apparatus further comprises:

a positioning interface, and the one or more memories and the computer program code are configured to, with the one or more processors, cause the mobile apparatus further to:

obtain the location data with the positioning interface.

8. The apparatus of claim 1, wherein the one or more memories and the computer program code are configured to, with the one or more processors, cause the mobile apparatus further to:

communicate, with the wireless transceiver utilizing the selected alternative subscriber identity module, data communication services, only while the mobile apparatus is roaming from the point of view of the default subscriber identity module.

9. The apparatus of claim 1, wherein the one or more memories and the computer program code are configured to, with the one or more processors, cause the mobile apparatus further to:

if the mobile apparatus is not roaming from the point of view of the default subscriber identity module, select either the default subscriber identity module or one of the alternative subscriber identity modules, for use for the data communication services; and communicate, with the wireless transceiver utilizing the selected subscriber identity module, data communication services, while the mobile apparatus is not roaming from the point of view of the default subscriber identity module.

10. The apparatus of claim 1, wherein the one or more memories and the computer program code are configured to, with the one or more processors, cause the mobile apparatus further to:

communicate the selection data with the operator-independent external electronic service such that the communication is initially performed with the wireless transceiver utilizing the default subscriber identity module, whereupon the communication is performed with the wireless transceiver utilizing the default subscriber identity module or with the wireless transceiver utilizing one of the alternative subscriber identity modules.

11. A method for operating a mobile apparatus, the mobile apparatus comprising:

a wireless transceiver;

a first mechanical slot to receive a first physical subscriber identity module card including a default subscriber identity module; and a second mechanical slot to receive a second physical subscriber identity module card including a plurality of alternative subscriber identity modules;

the method comprising:

communicating, with the wireless transceiver utilizing the default subscriber identity module as a master, voice and message services; communicating selection data with an operator-independent external electronic service, the selection data including information about network operators and data communication services offered by the plurality of the alternative subscriber identity modules, wherein the selection data includes one or more of: a data transfer capacity of the data communication service, costs of using the data communication service, costs of using the data communication service according to a day of week and/or time of day, according to a data transfer speed, availability of an operator/data communication service in a specific location, and/or rules for a selection indicating a preference between different operators in different locations; receiving, with the wireless transceiver utilizing the default subscriber identity module, network information about available network operators; obtaining location data determining a current location of the mobile apparatus; selecting an alternative subscriber identity module on a basis of the selection data, the network information, and the location data; and communicating, with the wireless transceiver utilizing the selected alternative subscriber identity module, data communication services, wherein the plurality of the alternative subscriber identity modules have been compiled in the second physical subscriber identity module card by an operator independent service provider providing the operator-independent external electronic service.

12. A non-transitory computer readable storage medium storing a program which, when executed, causes a mobile apparatus to perform the method of claim 11.

* * * * *